United States Patent [19]

Hammer

[11] Patent Number: 4,467,247
[45] Date of Patent: Aug. 21, 1984

[54] HIGH FREQUENCY FLUORESCENT LAMP CIRCUIT

[75] Inventor: Edward E. Hammer, Mayfield Village, Ohio

[73] Assignee: General Electric Company, Schenectady, N.Y.

[21] Appl. No.: 316,595

[22] Filed: Oct. 30, 1981

[51] Int. Cl.³ .................................. H05B 37/00
[52] U.S. Cl. .......................... 315/189; 315/230; 315/234; 315/DIG. 2
[58] Field of Search .............. 315/232, 188, 189, 190, 315/230, 234, DIG. 2

[56] References Cited

U.S. PATENT DOCUMENTS

| | | | |
|---|---|---|---|
| 3,096,464 | 7/1964 | Lemmers | 315/189 |
| 3,141,112 | 7/1974 | Eppert | 315/188 |
| 3,418,527 | 12/1968 | Miller | 315/189 |

Primary Examiner—Harold A. Dixon
Attorney, Agent, or Firm—Philip L. Schlamp; Fred Jacob

[57] ABSTRACT

A high frequency fluorescent lamp circuit for operating two or more fluorescent lamps connected in electrical series. A capacitor is connected between one end of the series-connected lamps and electrical ground and/or an electrically conductive fixture for holding the lamps. This causes the lamps to start more reliably and at a lower starting voltage.

2 Claims, 4 Drawing Figures

HIGH FREQUENCY FLUORESCENT LAMP CIRCUIT

BACKGROUND OF THE INVENTION

The invention is in the field of high frequency circuits for operating two or more fluorescent lamps connected in electrical series, and more particularly is directed to circuit means for improving starting of the lamps.

High frequency fluorescent lamp circuits generally operate the lamps at a frequency of about 20 kHz or higher, and have the advantage of achieving higher electrical efficiency as compared to the more conventional 60 Hz operation. In both low-frequency (60 Hz) and high-frequency circuits, lamp starting is improved by providing a conductive strip or coating along the bulb, or by positioning the bulbs adjacent and parallel to an electrically conductive reflector or fixture for holding the bulbs, a spacing of about one-half inch between the bulbs and the conductive reflector or fixture being suitable for aiding lamp starting. The improved starting is in the form of faster and more reliable starting, and also satisfactory starting at a lower circuit voltage applied across the lamps.

In a two-lamp circuit having two fluorescent lamps connected in electrical series, it is conventional to connect a starting capacitor across a first one of the lamps, and it functions by applying substantially all of the starting voltage across the second lamp, causing its electrical discharge to start, whereupon the lowered voltage drop of the second lamp applies sufficient voltage across the first lamp for starting it; the two lamps appear to start simultaneously. U.S. Pat. No. 4,237,403 to Davis, incorporated herein by reference thereto, shows, in FIG. 3, a high-frequency circuit for starting and operating two fluorescent lamps connected in electrical series, the circuit having a starting capacitor 94 connected across one of the lamps 70 and functioning to aid starting of the other lamp 71, as described in column 8, lines 49–54. The circuit also has a capacitor 56 connected across both lamps, and it resonates with the transformer secondary winding 55 to aid lamp starting, as described in column 5, lines 61–67.

While the above-described techniques are useful for achieving improved reliability of lamp starting, and achieve circuit economy by insuring lamp starting at lower circuit voltage, the desirability exists for further means of improving lamp starting in high-frequency lamp systems.

SUMMARY OF THE INVENTION

Objects of the invention are to provide an improved high-frequency circuit for starting and operating two or more series-connected fluorescent lamps, and for starting the lamps reliably and at reduced starting voltage.

The invention comprises, briefly and in a preferred embodiment, a high-frequency fluorescent lamp circuit for starting and operating two or more fluorescent lamps connected in electrical series, wherein the improvement comprises a capacitor connected between one end of the series-connected lamps and an electrical ground of the system such as a conductive reflector or fixture adjacent to the lamps. Preferably, a starting capacitor is connected across one of the lamps.

DESCRIPTION OF THE PRIOR ART

Figure 1:
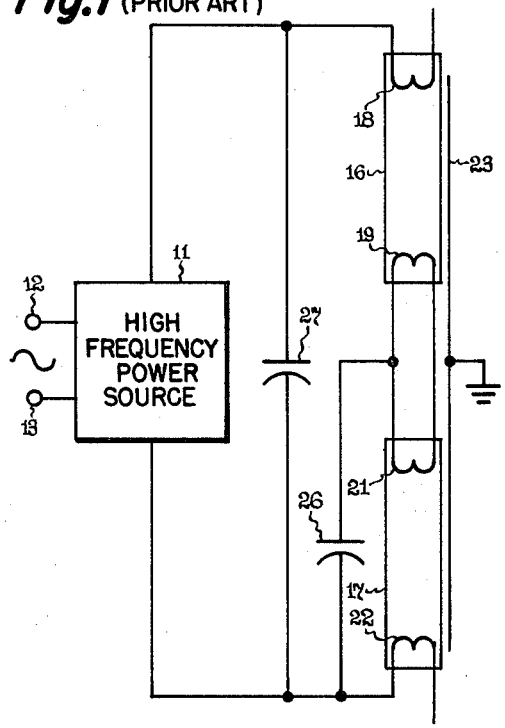
FIG. 1 is an electrical schematic diagram of a prior art high-frequency fluorescent lamp circuit.

In the prior art circuit of FIG. 1, a high-frequency power source 11 has terminals 12, 13 for connection to a 60 Hz input power source. Two fluorescent lamps 16, 17 are connected in electrical series across the output of the high-frequency power source 11, which output may be a transformer secondary winding 55 as shown in the above-referenced patent. The high-frequency power source 11 may provide an output alternating voltage at a frequency of about 20 kHz or higher. The lamp 16 is provided with cathodes 18, 19 and lamp 17 is provided with cathodes 21, 22 in the usual manner. A cathode 19, 21 of each lamp are connected to each other, preferably in electrical series or parallel and preferably are connected to a cathode current winding in the power source 11 for heating these cathodes, in well-known manner. Likewise, the cathodes 18 and 22 preferably are connected to cathode current windings in the power source 11 for heating these cathodes, in well-known manner. The lamps 16, 17 normally are positioned side-by-side a few inches apart and mutually parallel, and are mounted in a fixture having an electrically conductive area 23, usually having a light-reflective surface, adjacent and parallel to the lamps and spaced about one-half an inch therefrom. A starting capacitor 26 is connected across one of the lamps 17 to aid the starting of the lamps, and a resonating capacitor 27 is connected across the output of the power source 11 to further aid the lamp's starting, as described in the above-referenced patent.

DESCRIPTION OF THE PREFERRED EMBODIMENTS

Figure 2:
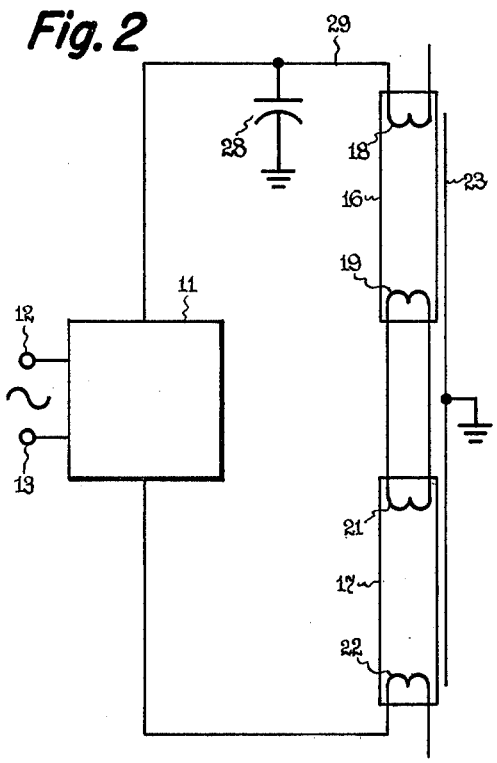
FIGS. 2, 3 and 4 are electrical schematic diagrams of alternative preferred embodiments of the invention.
Figure 3:
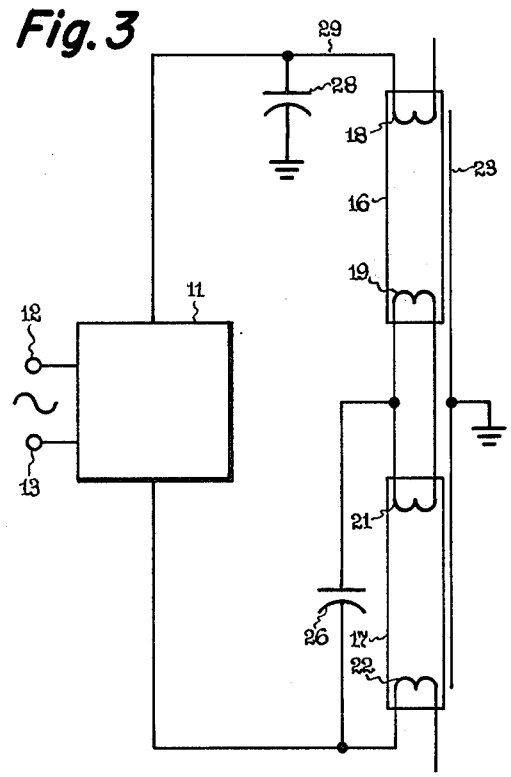
Figure 4:
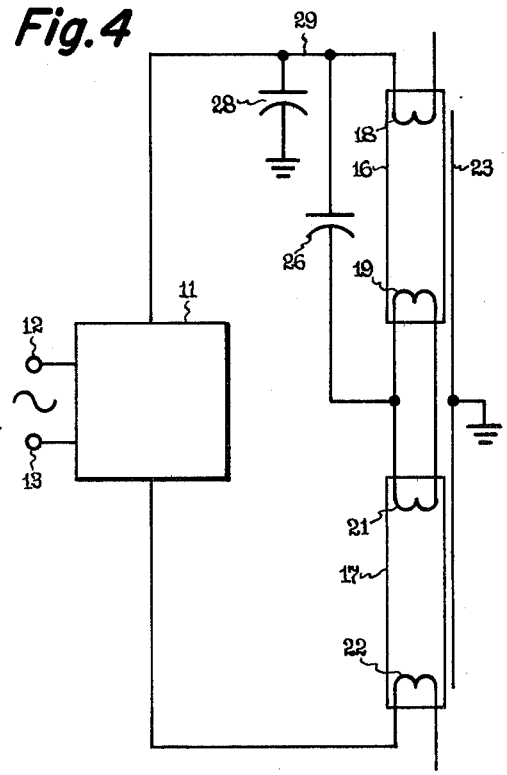

In the invention embodiments of FIGS. 2, 3, and 4, the circuit parts and components that are the same as in FIG. 1 are numbered the same as in FIG. 1. In accordance with the invention as shown in FIG. 2, a capacitor 28 is connected in the circuit between the cathode 18 at an outer end of one of the lamps 16, or to the conductor 29 for connection to the cathode 18 at the outer end of one of the lamps 16, and electrical ground which in this circuit means a connection to the fixture conductive member 23, and/or to conductive strips on the lamps bulbs, and/or to electrical earth ground. FIGS. 3 and 4 are the same as FIG. 2 except that they include a conventional starting capacitor 26 across one of the lamps, i.e. across lamp 17 in FIG. 3 and across lamp 16 in FIG. 4. The capacitor 28 preferably has a capacitance value of about 0.001 to 0.01 microfarads.

The capacitor 28, connected in accordance with the invention between an outer cathode connection to one of the lamps and "electrical ground" as defined above, has the desirable effect of reducing the value of starting voltage (applied from high frequency power source 11 and across the series-connected lamps) required to start the lamps. For example, in tests conducted with a circuit 11 operating at 20 kHz, standard 40-watt fluorescent lamps for the lamps 16, 17, capacitance values of 0.01 for each of the capacitors 26, 27, and 28, and a conductive fixture/reflector 23 spaced one-half an inch from the lamps, the lamps started reliably at the following starting voltages for the circuits shown: FIG. 1, 306 volts; FIG. 2, 278 volts; FIG. 3, 261 volts; and FIG. 4, 261 volts. Thus, it is seen that the invention considerably reduces the value of starting voltage and/or increases the reliability of lamp starting, and does so in a unique, economical, and convenient manner. The invention can be used in systems having two or more lamps connected in electrical series.

The invention achieves improved starting with the capacitor 28 connected to the fixture/reflector 23, and also with it connected to electrical ground irrespective of whether the fixture/reflector 23 is present. Best results appear to be achieved when the capacitor 28 is connected to a fixture/reflector 23 and both of them are electrically grounded to the electrical power system and/or to earth ground. The exact theory by which the improved starting takes place is not understood; however, tests made of the invention have indicated its effectiveness.

While preferred embodiments and modifications of the invention have been shown and described, various other embodiments and modifications thereof will become apparent to persons skilled in the art and will fall within the scope of the invention as defined in the following claims.

What I claim as new and desire to secure by United States Letters Patent is:

1. A high-frequency fluorescent lamp circuit for starting and operating two or more fluorescent lamps connected in electrical series at a frequency of about 20 kHz or greater, said circuit having a pair of conductors for connection across said series-connected lamps, wherein the improvement comprises a conductive member connected to electrical ground and disposed adjacent and substantially parallel to said lamps; and a capacitor having a value of capacitance at or between about 0.001 and 0.01 microfarads connected between one of said conductors and said conductive member.

2. A circuit as claimed in claim 1 including a starting capacitor connected across one of said lamps.

* * * * *